(12) United States Patent
Capon

(10) Patent No.: US 12,181,275 B2
(45) Date of Patent: Dec. 31, 2024

(54) DEVICE FOR OBTAINING ACCURATE MEASUREMENTS FROM A FLEXIBLE TAPE MEASURE

(71) Applicant: Invent & Create Ltd, Brighton (GB)

(72) Inventor: Stephen John Capon, Brighton (GB)

(73) Assignee: Invent &Create Ltd, East Sussex (GB)

(*) Notice: Subject to any disclaimer, the term of this patent is extended or adjusted under 35 U.S.C. 154(b) by 0 days.

(21) Appl. No.: 17/602,040

(22) PCT Filed: Apr. 7, 2020

(86) PCT No.: PCT/GB2020/000040
§ 371 (c)(1),
(2) Date: Oct. 7, 2021

(87) PCT Pub. No.: WO2020/208329
PCT Pub. Date: Oct. 15, 2020

(65) Prior Publication Data
US 2022/0196375 A1  Jun. 23, 2022

(30) Foreign Application Priority Data
Apr. 11, 2019 (GB) ..................... 1905149

(51) Int. Cl.
*G01B 3/1061* (2020.01)
(52) U.S. Cl.
CPC .... *G01B 3/1061* (2013.01); *G01B 2003/1066* (2013.01)
(58) Field of Classification Search
CPC .......... G01B 3/1061; G01B 2003/1066; G01B 3/1071; G01B 2003/1079
See application file for complete search history.

(56) References Cited

U.S. PATENT DOCUMENTS 1,196,045 A * 8/1916 Strieff ..................... A45F 5/022
24/10 A
1,363,765 A * 12/1920 Emerson ................. A45F 5/022
24/10 A
(Continued)

FOREIGN PATENT DOCUMENTS

CH           708010 A2    10/2014
CN        106839917 A     6/2017
(Continued)

*Primary Examiner* — John Fitzgerald
*Assistant Examiner* — Tania Courson

(57) ABSTRACT

A device (16) for obtaining accurate measurements from a flexible tape measure (2), with the measurements being from a first position (8) to a second position and wherein the second position (12) requires the tape measure (2) to be bent through an angle, the device (16) comprising: (i) a body portion (18) for receiving the tape measure (2); (ii) securing means (20) for securing the device (16) to the tape measure (2); (iii) a measurement formation (22) which is positionable at the second position (12), and the device (16) being such that: (iv) the device (16) is positionable on the tape measure (2) with the measurement formation (22) at the second position (12); (v) the securing means (20) temporarily secures the device (16) without moving with respect to the tape measure (2), whereby the tape measure (2) is removable from the second position (12) and is no longer bent through the angle; and (vi) the measurement from the first position (8) to the second position (12) is the same as a measurement from the first position (8) to the measurement formation (22) whereby the measurement from the first position (8) to the second position (12) is obtainable without the tape measure (2) being bent through the angle at the time of the measurement.

1 Claim, 4 Drawing Sheets

(56) References Cited

U.S. PATENT DOCUMENTS

| | | | |
|---|---|---|---|
| 2,204,353 A | | 6/1940 | Fulton |
| 2,469,674 A | * | 5/1949 | Witchger ............. G01B 3/1041 |
| | | | 242/380 |
| 3,324,560 A | * | 6/1967 | Snyder ................. G01B 3/1071 |
| | | | 242/380 |
| 4,507,869 A | * | 4/1985 | Stude ...................... B43L 7/005 |
| | | | D10/64 |
| 5,600,894 A | * | 2/1997 | Blackman ............ G01B 3/1056 |
| | | | 33/770 |
| 5,606,803 A | | 3/1997 | O'Sullivan |
| 6,804,898 B1 | * | 10/2004 | Hsu ....................... G01B 3/1071 |
| | | | 33/668 |
| 7,490,415 B1 | * | 2/2009 | Cubbedge ............. G01B 3/1084 |
| | | | 33/770 |
| 9,476,687 B2 | * | 10/2016 | Higginbotham ...... G01B 3/1061 |
| 9,658,046 B2 | * | 5/2017 | Fulton .................. G01B 3/1084 |
| 9,816,795 B2 | * | 11/2017 | Bitton ................... G01B 3/1084 |
| 10,907,947 B2 | * | 2/2021 | Vuylsteke ................. G01B 3/04 |
| 11,680,783 B2 | * | 6/2023 | Pabst .................... G01C 15/006 |
| | | | 33/760 |
| 2006/0112583 A1 | | 6/2006 | Sullivan |
| 2010/0115777 A1 | * | 5/2010 | Lee ....................... G01B 3/1084 |
| | | | 33/27.01 |
| 2012/0073155 A1 | * | 3/2012 | Mabey .................. G01B 3/1005 |
| | | | 33/770 |
| 2015/0075022 A1 | * | 3/2015 | Bitton ...................... B25H 7/04 |
| | | | 33/760 |
| 2015/0233691 A1 | | 8/2015 | Higginbotham |

FOREIGN PATENT DOCUMENTS

| | | |
|---|---|---|
| FR | 1051680 A | 1/1954 |
| KR | 20100111579 A | 10/2010 |

\* cited by examiner

DEVICE FOR OBTAINING ACCURATE MEASUREMENTS FROM A FLEXIBLE TAPE MEASURE

This invention relates to a device for obtaining accurate measurements from a flexible tape measure. More especially, this invention relates to a device for obtaining accurate measurements from a flexible tape measure when the tape measure is required to be bent through an angle at the time of taking a measurement.

Flexible tape measures are well known. One well known type of flexible tape measure used in industry is an retractable flexible steel tape measure. Another type of known flexible tape measure which is used more for domestic purposes is a roll flexible tape measure made of fabric or a plastics material.

In taking measurements from a first position to a second position, situations sometime arise where the second position requires the flexible tape measure to be flexed through an angle. Typically, this situation occurs when the second position is a wall or an upright which prevents the tape measure extending past the wall or the upright, and which thus requires the tape measure to be bent up the upright. In situations where the tape measure is flexed through an angle, it is difficult to obtain a precise measurement because the measurement has to be obtained from the curved part of the tape measure as it extends through the required angle. Invariable an approximation is made and often the approximation is not accurate. There are many situations where an inaccurate measurement is not acceptable. Typical of such situations is the glazing industry where glazing may need to be a precise fit in a frame, and where the frame may need to be a precise fit in an aperture in a building.

It is an aim of the present invention to avoid or reduce the above mentioned problem.

Accordingly, in one non-limiting embodiment of the present invention there is provided a device for obtaining accurate measurements from a flexible tape measure, with the measurements being from a first position to a second position and wherein the second position requires the tape measure to be bent through an angle,
the device comprising:
(i) a body portion for receiving the tape measure;
(ii) securing means for securing the device to the tape measure;
(iii) a measurement formation which is positionable at the second position,
and the device being such that:
(iv) the device is positionable on the tape measure with the measurement formation at the second position;
(v) the securing means temporarily secures the device without moving with respect to the tape measure, whereby the tape measure is removable from the second position and is no longer bent through the angle; and
(vi) the measurement from the first position to the second position is the same as a measurement from the first position to the measurement formation, whereby the measurement from the first position to the second position is obtainable without the tape measure being bent through the angle at the time of the measurement.

The device of the present invention is such that it is able to avoid the errors caused by taking measurements at a time when the tape measure is bent through an angle. Typically the angle is 90° but the angle may be various other angles in dependence upon the type of objects requiring measuring. Additionally, the device is able easily to be used.

The device may be one in which the device is positionable on the tape measure with the measurement formation at the second position by being sidable along the tape measure. The device may be otherwise positioned on the tape measure if desired. A sliding movement is preferred because it is simple, and the device remains attached to the tape measure during use of the device.

Preferably, the securing means is integrally formed with the body portion. The securing means may however be separately formed from the body portion if desired.

The device may be one in which the securing means is a securing means which is biased to a securing position which enables the temporary securing of the device to the tape measure. The biasing may be provided by the formation of the securing means, for example as an integral part of the body portion, and/or the biasing may be due to the material from which the securing means is made. Other types of securing means may be employed so that, for example, the securing means may be a clip securing means which is operable between open and closed positions.

The device may be one in which the body portion has an upper surface which has a contour which is complementary to a cross-sectional contour of the tape measure, whereby the device fits securely to the tape measure along the length of the tape measure. The contour may be a concave contour, for example in the case where the tape measure is a flexible steel tape measure having a cross-sectional concave contour.

The securing means may have a gripper formation for increasing the grip by which the securing means secures the device to the tape measure. The gripper formation may be configured for engaging tape measures of different widths. This facilitates the use of the device on tape measures of different widths.

The gripper formation may be a series of ribs. Other types of gripper formation may be employed.

The measuring formation may be a straight edge which enables a measurement reading across the width of the tape measure and thereby along both longitudinal edges of the tape measure. With such a straight edge measuring formation, readings are easily obtained in two different measurements, for example in imperial and in metric measurements as are usually given along the two opposing longitudinal edges of a tape measure. Measurements in other measuring units may be employed. The device may be one in which there are two of the straight edges, and in which there is one of the straight edges at each of two opposite ends of the body portion. The measuring formation may be other than a straight edge if desired. Where the measuring formation is a straight edge, then the straight edge may form one end of the body portion. The straight edge may be positioned elsewhere on the device if desired.

The device may be a moulded device. In this case, the device may be moulded from a plastics material such for example as polypropylene or acrylonitrile-butadiene-styrene (ABS). Alternatively, the device may be made from a metal such for example as stainless steel. The device may be cast from metal, or it may be stamped from sheet metal. Generally the device may be made from any suitable and appropriate material.

The device may be one in which the body portion has an opening, and in which the securing means is located over the opening. Such an opening may facilitate the in-line moulding of the device if the device is a moulded device.

The body portion may include attachment means for attaching the device to a mounting. The device may thus be attached to a mounting for storage, for example with the mounting being a key ring or a nail on a wall. The attachment means is preferably a hole. Other types of attachment means may be employed, for example clips.

The device may be one in which the device is formed as a business card for additionally providing business promotion facilities. For example, business details may be provide on a reverse side of the card when the card is formed as a business card.

The device may include a recess for receiving a removable scraper. The scraper may be a scraper blade. The provision of a removable scraper may be especially useful for certain industries, for example the glazing industry and the decoration industry.

Embodiments of the invention will now be described solely by way of example and with reference to the accompanying drawings in which.

Figure 1:
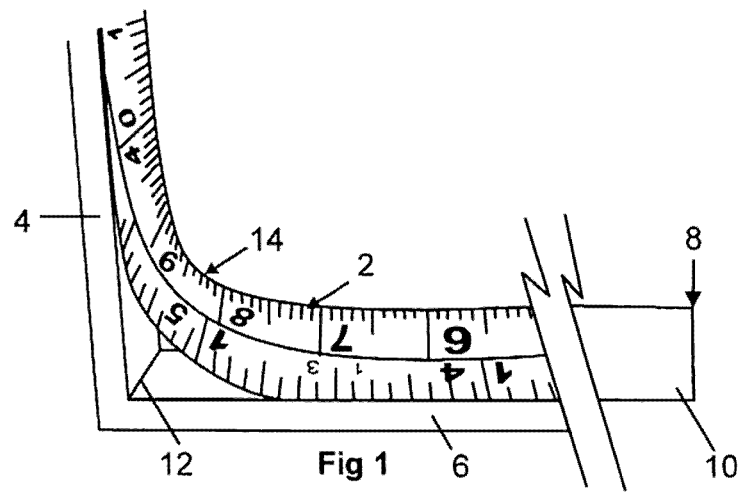
FIG. 1 shows a flexible tape measure being required to flex through an angle in order to obtain a measurement.

Referring to FIG. 1, there is shown a tape measure 2 forming part of a well known roll-type steel flexible tape measure that is extendable and retractable into a housing. The tape measure 2 is shown being flexed through an angle of 90° caused by a measurement being required at a right angle formed by two sides 4, 6 of an object. The measurement with the tape measure 2 is effected from a first position 8 at a free end 10 of the tape measure 2 to a second position 12 which is in a corner defined by the two sides 4, 6. The two sides 4, 6 may form part of an object such for example as a window frame, a door frame or a cabinet. As can be seen from FIG. 1, the second position 12 requires the tape measure 2 to be flexed through an angle of 90°. This causes the tape measure 2 to have a curve 14 at the position at which measurement is required. This curve 14 means that the precise distance from the first position 8 to the second position 12 needs to be a visual estimation. This may lead to measurement inaccuracies which are generally not to be preferred and which may be unacceptable in some industries.

Referring now to FIGS. 2-9, there is shown a device 16 of the present invention. Similar parts as in FIG. 1 have been given the same reference numerals for ease of comparison and understanding.

The device 16 is for obtaining accurate measurements from a flexible tape measure 2, with the measurements being from a first position 8 to a second position 12. The second position 12 requires the tape measure 2 to be bent through an angle. As shown, the angle to which the tape measure is bent is 90° and this requires the tape measure 2 to have the curve 14 the same as in FIG. 1. The device 16 comprises a body portion 18 for receiving the tape measure 2. The device 16 also comprises securing means 20 for securing the device 16 to the tape measure 2. The device 16 further comprises a measurement formation 22 which is positionable at the second position 12.

The device 16 is such that it is positionable on the tape measure 2 with the measurement formation 22 at the second position 12. The securing means 20 temporarily secures the device 16 without moving with respect to the tape measure 2, whereby the tape measure 2 is removable from the second position 12 and is no longer bent through the angle.

Figure 2:
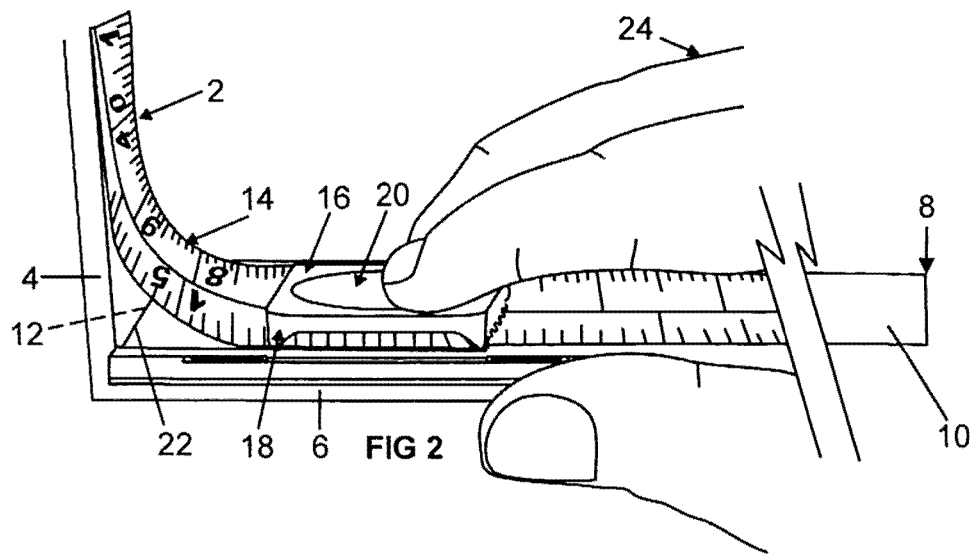
FIG. 2 shows the tape measure in the situation of FIG. 1 but provided with a first device of the present invention.
Figure 3:
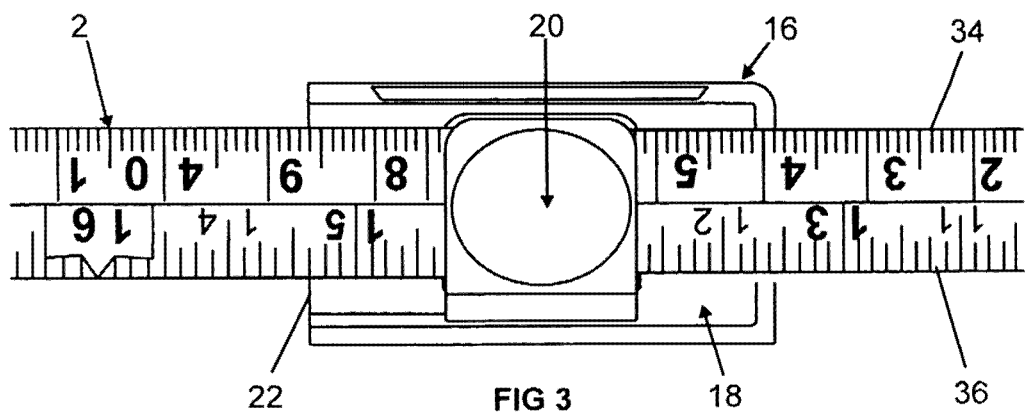
FIG. 3 is a plan view of the first device of the present invention and after it has been removed from the corner position shown in FIG. 2.

The measurement from the first position 8 to the second position 12 is the same as a measurement from the first position 8 to the measurement formation 22 when the measurement formation 22 is positioned at the second position 12 as shown in FIG. 2. FIG. 3 shows the tape measure 2 and the device 16 moved from the position shown in FIG. 2 and such that the tape measure 2 is able to extend in a straight line. During this movement, the securing means 20 ensures that the device 16 does not move with respect to the tape measure 2. In the position shown in FIG. 3, the precise position of the tape 2 with respect the measurement formation 22 is easily seen and precisely measured. Thus the measurement from the first position 8 to the second position 12 is able to be obtainable by the device 16 without the tape measure 2 being bent through the angle giving the curve 14 at the time of the measurement. Thus the device 16 is able to avoid the errors obtained by approximating a measurement due the measurement being taken with the curve 14 being in place. As shown in FIG. 3, a precise measurement is easily obtainable simply because the second position 12 is defined by the measurement formation 22.

The device 16 is positionable on the tape measure 2 with the measurement formation 22 at the second position by being slidable along the tape measure 2. The device 16 is easily able to be positioned on the tape measure 2, and the sliding along the tape measure 2 enables the device 16 easily to be moved with one hand 24 to the second position as shown in FIG. 2.

The securing means 20 is integrally formed with the body portion 18. The securing means 20 is a securing means 20 which is biased to a securing position which enables the temporary securing of the device 16 to the tape measure 2.

Figure 4:
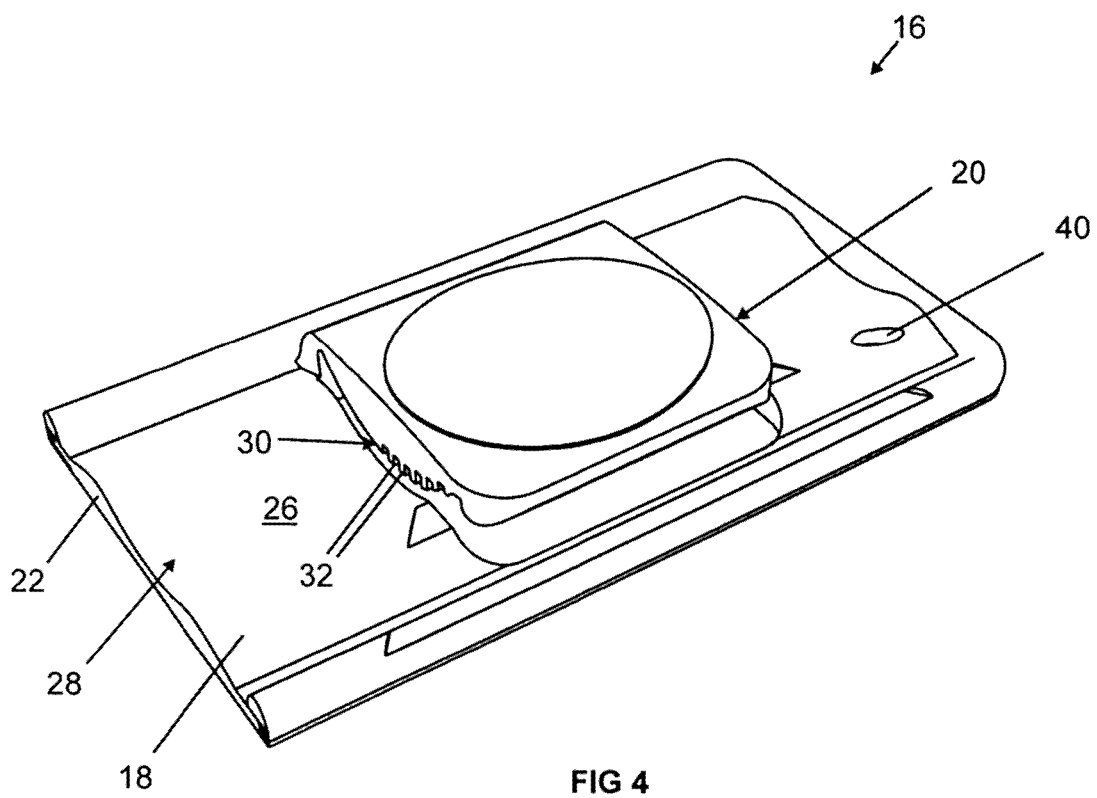
FIG. 4 is a perspective view of the device as shown in FIGS. 2 and 3.

As best appreciated from FIG. 4, the body portion 18 has an upper surface 26 which has a contour which is complementary to a cross-sectional contour of the tape measure 2. This enables the device 16 to fit securely to the tape measure 2 along the length of the tape measure 2. As shown in FIG. 4, the contour is a concave contour 28. The tape measure 2 has a complementary concave contour.

Figure 5:
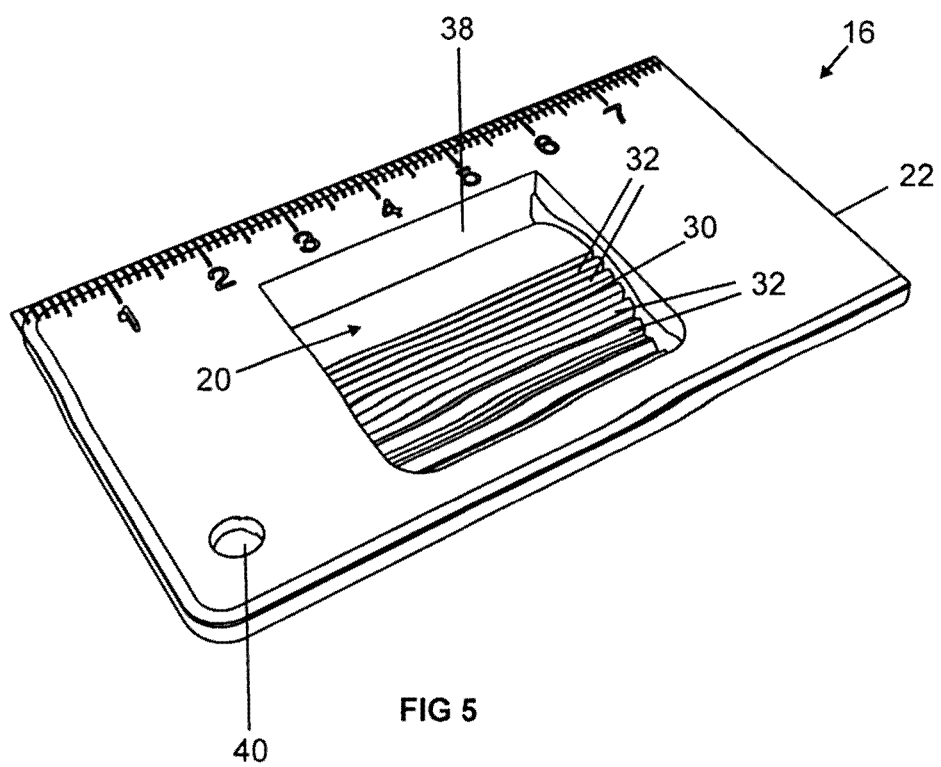
FIG. 5 is a perspective view of the device shown in FIG. 4 but turned through 180° and illustrates an aperture in a body portion of the device.
Figure 6:
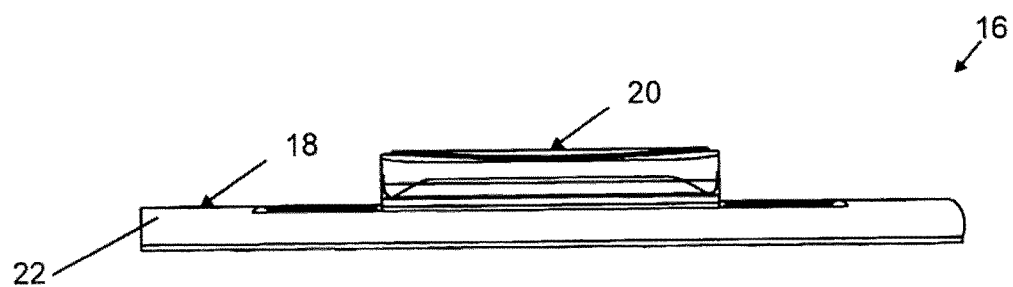
FIG. 6 is a side view of the device as shown in FIG. 4.
Figure 7:
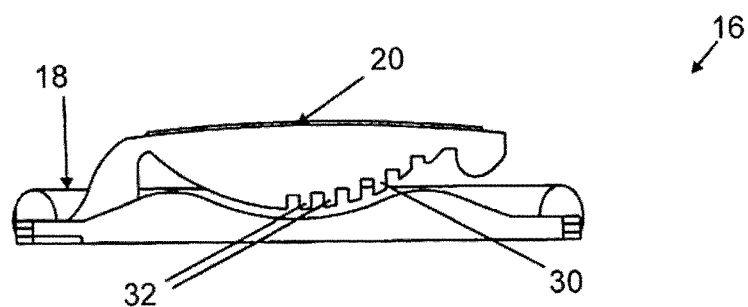
FIG. 7 is an end view of the device as shown in FIG. 4.

As shown in FIGS. 4, 5 and 7, the securing means 20 has a gripper formation 30 for increasing the grip by which the securing means 20 secures the device 16 to the tape measure 2. The gripper formation 30 is configured for engaging tape measures 2 of different widths. This is advantageous because known tape measures 2 are manufactured in different widths. The gripper formation 30 is a series of ribs 32 as shown.

The measuring formation 22 is a straight edge which enables a measurement reading across the width of the tape measure 2, and thereby along both longitudinal edges 34, 36 of the tape measure 2. The measurement formation 22 thus enables an easy reading from the two different measurement scales which are usually provided along the longitudinal edges 34, 36 of known tape measures. As illustrated, one longitudinal edge gives imperial measurements and the other longitudinal edge gives metric measurements. The measurement formation 22 in the form of the straight edge is at one end of the body portion 18 as can best be appreciated from FIG. 3.

The device 16 is a moulded device 16 which may be made from a plastics material such for example as polypropylene or ABS. The body portion 18 has an opening 38 as best appreciated from FIG. 5. The securing means 20 is located over the opening 38. The opening 38 is an optional feature which facilitates in-line moulding of the device 16 from a plastics material.

The body portion 18 includes attachment means in the form of a hole 40 for attaching the device 16 for mounting such for example a key ring or a nail on a wall.

The device 16 may be formed as a business card for additionally providing business promotion facilities. For example, business details may be provided on an underside of the device 16.

Figure 8:
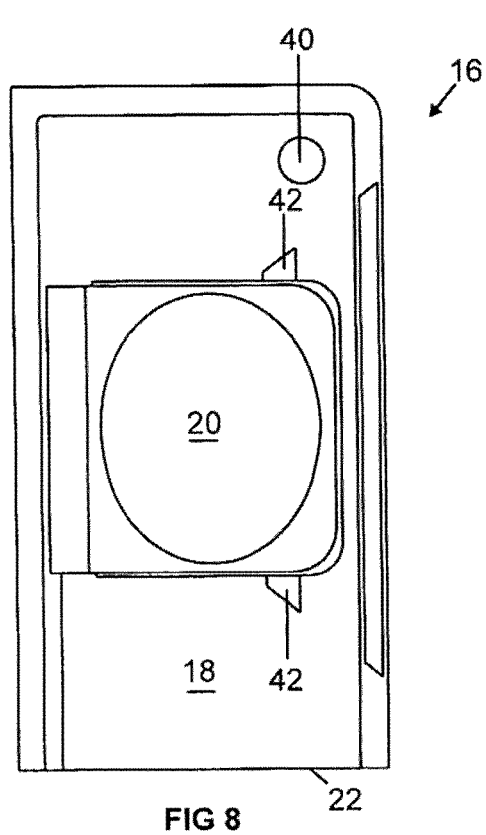
FIG. 8 is a plan view of the device as shown in FIG. 4.
Figure 9:
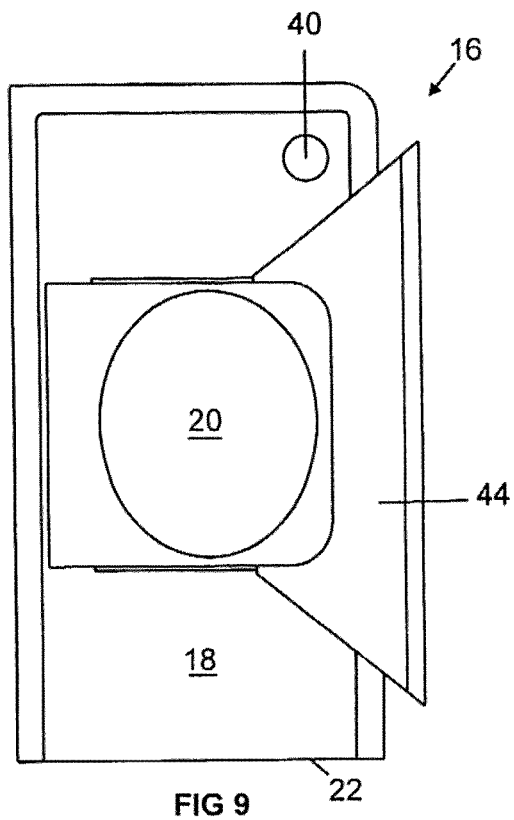
FIG. 9 shows the device as shown in FIG. 8, and optionally provided with a removable scraper in the form of a scraper blade.

As shown in FIGS. 8 and 9, the device 16 is optionally provided with a recess 42 for receiving a removable scraper in the form of a scraper blade 44.

Figure 10:
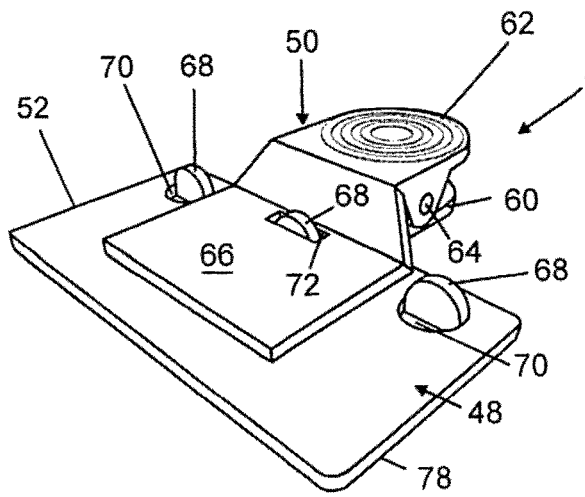
FIG. 10 is a perspective view of a second device of the present invention.
Figure 11:
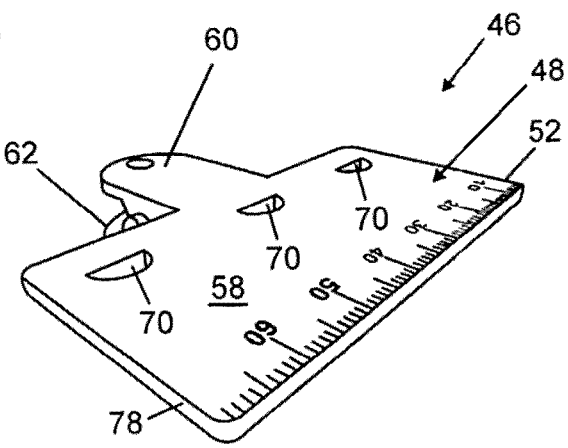
FIG. 11 is an underneath view of the device as shown in FIG. 10.
Figure 12:
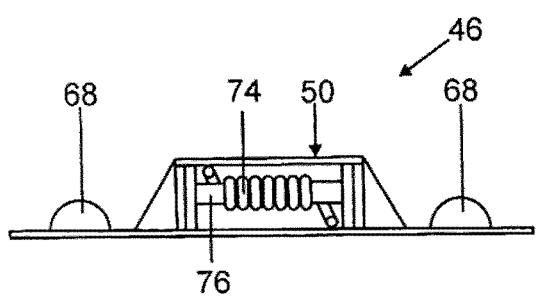
FIG. 12 is an end view of the device as shown in FIG. 10.

Referring now to FIGS. 10-12, there is shown a device 46 for obtaining accurate measurements from a flexible tape measure 2. The device 46 is able to be used in the same manner as the device 16. The device 46 comprises a body portion 48 for receiving the tape measure, securing means 50 for securing the device 46 to the tape measure, and a measurement formation 52. The measurement formation 52 is positionable at the second position 12 shown in FIGS. 1 and 2.

The device 46 is made of stainless steel. The body portion 48 has an upper face 54 which is provided with a measuring scale 56. The body portion 48 has a lower face 58 which may also be provided with a measuring scale 56. The measuring scale or scales 56 may be in metric or imperial measurements as may be desired.

The securing means 50 is a clip securing means. The clip securing means 50 has an opener formation in a form of a first member 60 which is formed as an extension of the body portion 48 as can be seen from FIGS. 10 and 11. A second member 62 is pivotally mounted by a pivot 64 to the first member 60. When the first and second members 60, 62 are squeezed together, a jaw 66 pivots upwardly to allow the tape measure 2 to be inserted over the upper face 54. The upper face 54 has three abutments 68 which serve as locator means against which the tape measure 2 is able to be located. The abutments 68 extend through apertures 70 in the body portion 48. As shown in FIG. 10, the central abutment 68 extends through an aperture 72 in the jaw 66. The jaw 66 extends parallel to the upper face 54 and thus securely grips the tape measure 2.

As shown in FIG. 12, the securing means 50 is spring biased by a spring 74 to the closed position shown in FIG. 10. The spring 74 is mounted on mounting means in the form of a tube 76. The tube 76 locates at each end in the illustrated parts of the securing means 50.

Figure 13:
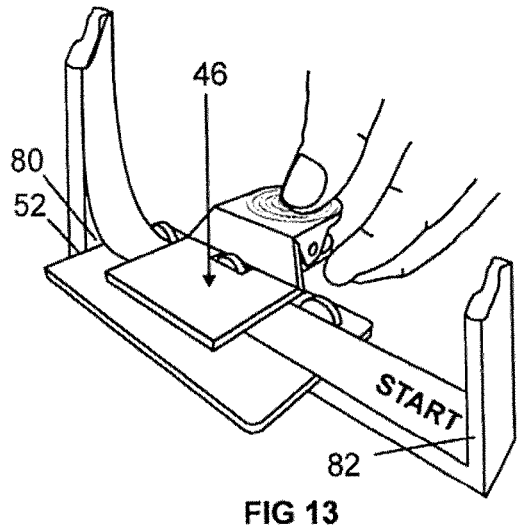
FIG. 13 shows the device of FIG. 10 being used in the left hand corner of a window frame.
Figure 14:
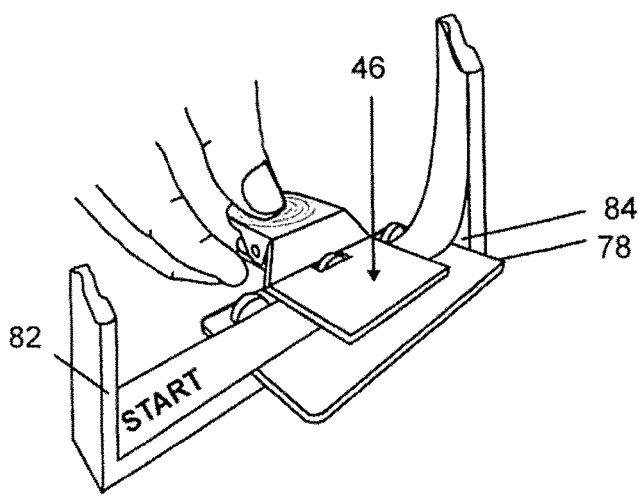
FIG. 14 shows the device of FIG. 10 being used in the right hand corner of a window frame.

FIG. 10 best illustrates how the device 46 has a first measurement formation 52, and also a second measurement formation 78. Thus the device 46 is such that each measurement formation 52, 78 is a straight edge, and there is one of the straight edges at each of two opposite ends of the body portion 48. FIG. 13 shows the device 46 in a left hand corner 80 of a window frame 82. In the left hand corner 80, the device 46 is such that the measurement formation 52 is used. FIG. 14 shows the device 46 being used in a right hand corner 84 of the window frame 82. In the right hand corner 84, the measurement formation 78 is used.

The devices 16, 46 are able inexpensively to be made. They are also able easily to be used. Accurate measurements are easily obtainable.

It is to be appreciated that the embodiments of the invention described above with reference to the accompanying drawings have been given by way of example only and that modifications may be effected. Thus, for example, the devices 16, 48 may be used with another type of flexible tape measure 2, for example one made of cloth or a plastics material. The body portions 18, 48 may be of another shape. Another type of securing means 20, 50 and another type of measurement formation 22, 52 may be employed. The gripper formation may be omitted or a gripper formation 30 other than the illustrated ribs 32 may be employed. Depending upon the material or materials from which the devices of the present invention are made, they may be made in various ways including moulding, casting, stamping and pressing. Individual components shown in the drawings are not limited to use in their drawings and they may be used in other drawings and in all aspects of the invention. The invention also extends to the individual components mentioned and/or shown above, taken singly or in any combination.

The invention claimed is:

1. A device for obtaining measurements from a flexible tape measure, with the measurements being from a first position to a second position and wherein the second position requires the flexible tape measure to be bent through an angle;

the device comprising:
i. a body portion constructed to receive the flexible tape measure during use;
ii. a securing means for securing the device to the flexible tape measure during use;
iii. a measurement formation;
   wherein,
iv. the body portion has an upper face which is provided with at least three abutments to serve as locator means against which the flexible tape measure is able to be located during use;
   and,
v. the measurement formation is a straight edge, locatable at each of the two opposite ends of the body portion;
   and,
vi. the securing means is a clip securine means: wherein the clip securing means comprises:
a. a jaw;
b. an opener formation in the form of a first member, the first member formed as an extension to the body portion;
c. a second member, pivotally mounted by a pivot to the first member;
d. a mounting means in the form of a tube;
e. the tube being locatable between each end of the securing means;
   and,
f. a spring mounted on the tube;
   whereby:

vii. when the first member and the second members are squeezed together, the jaw pivots upwardly to allow insertion of the flexible tape measure; and, viii. the spring biases the securing means into a closed position.

* * * * *

UNITED STATES PATENT AND TRADEMARK OFFICE
CERTIFICATE OF CORRECTION

| | | |
|---|---|---|
| PATENT NO. | : 12,181,275 B2 | Page 1 of 1 |
| APPLICATION NO. | : 17/602040 | |
| DATED | : December 31, 2024 | |
| INVENTOR(S) | : Stephen John Capon | |

It is certified that error appears in the above-identified patent and that said Letters Patent is hereby corrected as shown below:

In the Claims

Column 6 Line 55, in Claim 1, delete "securine" and insert --securing--.

Signed and Sealed this
Fourth Day of February, 2025

Coke Morgan Stewart
*Acting Director of the United States Patent and Trademark Office*